H. GEISENHÖNER & E. F. COLLINS.
METAL WORKING.
APPLICATION FILED AUG. 14, 1914.
1,164,278.
Patented Dec. 14, 1915.
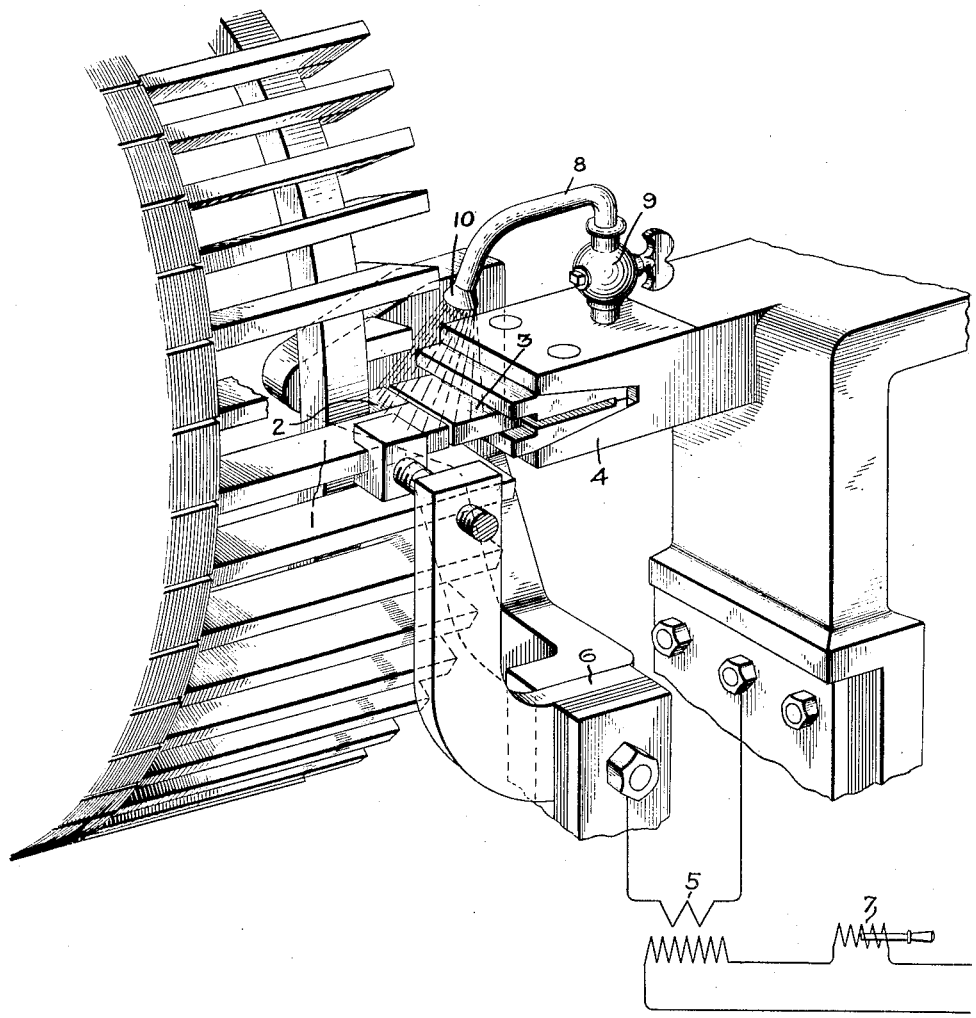
Witnesses:
Marcus L. Byng.
J. Ellis Glen.
Inventors:
Henry Geisenhöner,
Edgar F. Collins.
by
Their Attorney.

UNITED STATES PATENT OFFICE.

HENRY GEISENHÖNER AND EDGAR F. COLLINS, OF SCHENECTADY, NEW YORK, ASSIGNORS TO GENERAL ELECTRIC COMPANY, A CORPORATION OF NEW YORK.

METAL-WORKING.

1,164,278. Specification of Letters Patent. Patented Dec. 14, 1915.

Application filed August 14, 1914. Serial No. 856,777.

*To all whom it may concern:*

Be it known that we, HENRY GEISENHÖNER and EDGAR F. COLLINS, citizens of the United States, residing at Schenectady, county of Schenectady, and State of New York, have invented certain new and useful Improvements in Metal-Working, of which the following is a specification.

Our invention relates to electric resistance metal working and particularly to butt welding.

The object of our invention is to improve the qualities of the work done.

In its broadest aspect our invention is applicable to all forms of metal working where it is desired to modify the structure at one or more points, but it is particularly advantageous in butt welding and we have therefore chosen to describe particularly this embodiment of our invention.

In welded joints as commonly made prior to our invention, it is often noticeable that the union is more or less an autogenously soldered one rather than wholly a truly welded one; for example, microscopic examination of the junctures of butt welded bars of cold rolled copper, show that the crystallization of the material changes, reading in a direction at right angles to the junctures, from the fine grained structure of one bar to a coarser grained structure more nearly resembling cast metal at the point of union, and finally to the fine grained structure of the second bar. In short the structure of the finished article is not uniform. Furthermore the tendency of the materials to rapidly oxidize in the open air at the temperatures to which they must be subjected, introduces factors conducive to poor work.

We have discovered that by discharging a cooling liquid, water for example, on to the surface of the portions of the metals being heated, we are enabled to butt weld copper bars with a substantially uniform structure throughout the juncture. In practising our invention we use an ordinary form of welding machine to which we have added a nozzle for discharging liquid on to the work. We have found that the best results are obtained, in the case of copper at least, by continuing the flow of the liquid over the work after the welding current has been cut off so as to rapidly cool the work.

The single figure in the drawing illustrates a portion of a welding machine arranged for practising our invention in the manufacture of induction motor rotors, the electrical connections being diagrammatically represented.

We have shown our invention applied to welding the end rings to the conductor bars of a rotor of an induction motor. Either the bar 1 or the projection 2 of the end ring or both may be welded to the member 3 in a single operation. The member 3 is held by the clamp 4 which, as in the common form of machine, may be moved toward and away from the jaws holding the members 1 and 2. One side of the secondary 5 of the transformer is connected through the usual clamp or connector 6 to the bar 1 (or the ring 2, or both in parallel, according to whether one alone or both are to be welded simultaneously to the member 3); the other side of the secondary 5 is connected to the member 3 through the clamp 4. The amount of energy supplied to the primary of the transformer and hence to the work, is controlled by the regulating reactance 7 in the usual manner.

The body of the clamping member 4 is provided with water cooling passages (not shown) as is usual, the water leaving these passages through the pipe 8 which contains a valve 9 for regulating the amount of water flowing through it. The pipe 8 terminates in a nozzle 10 which is so located that the water flowing from it is directed on the juncture between the members 1 and 2 and the member 3 of the work. Obviously the water is easily kept away from the rest of the work. It is not essential to our invention, as will be obvious, that the water supplied to the nozzle 10 pass through the cooling passages of the clamping member 4.

The operation is as follows: The amount of water which is applied to the work is regulated by the valve 9 and the electrical energy by the reactance 7. The members 1, 2 and 3 are placed in position and with the requisite pressure exerted on the junctures and the water running on them, energy is supplied to the machine. As the members 1, 2 and 3 soften at their junctures, the clamping member 4 is moved forward to form the weld, the circuit to the machine is broken and shortly thereafter the work is removed therefrom. After the weld is completed the flow of water may be stopped though it will generally be found better not to stop the flow until after the work has cooled considerably. When there are a number of similar pieces to be welded successively, it is not necessary to stop the flow of water after each weld is made but the water may continue to flow while other sets of materials are supplied to the machine and the cycle repeated. The whole operation is similar to that common before our invention, except for the supply of water to the work. The amount of water required varies with the work and rate of energy supply but may be readily determined in practice; for welding copper bars when the cross area of the weld is approximately three-eighths by one-half of an inch, we have used about one and a half gallons of water per hour.

As suggested above, when using such a device, we have found that we can without difficulty obtain a fine grained structure at the juncture and prevent the oxidation of the materials of the work, the latter probably through excluding air from the work by means of the water itself and the steam which is generated when the water comes in contact with the heated work, and the former probably through the better control of the temperature of the work due to the combined action of the cooling liquid and the heating current, whereby it is more easily kept below the melting point. Maintaining the flow of water after the current is removed from the work tends toward a rapid cooling of the work, which in the case of copper at least, also seems beneficial to the quality of the weld. All liquids are in general more or less adapted to be substituted for water in an embodiment of our invention; the character and general availability of water, however, particularly adapt it for this use.

While we have described the principle of our invention and the best mode we have contemplated for applying this principle, other modifications will occur to those skilled in this art and we aim in the appended claims to cover all modifications which do not depart from the spirit and scope of our invention.

What we claim as new and desire to secure by Letters Patent of the United States, is:—

1. The combination with an electric resistance welding machine provided with means for passing current through the work across the juncture, of means for flowing water over the work directly at the weld.

2. The combination with an electric resistance welding machine and two contacting bodies therein to be welded, the machine being provided with means for passing current between the bodies across the juncture, of means for flowing water over the juncture of the bodies.

3. The combination with an electric resistance metal working machine provided with means for passing current through and from one side to the other of the portion of the work which is being operated on, of means for flowing water over the portion of the work which is being operated on.

4. The portion of the method of electric resistance welding of metal bodies which comprises flowing water directly over the juncture while passing current between said metal bodies through the juncture.

5. The portion of the method of metal working which comprises subjecting the portion of the work being operated on to a heating effect and a cooling effect simultaneously, and continuing the cooling effect after the cessation of the heating effect.

6. The portion of the method of welding which comprises subjecting the juncture during the welding operation to both a heating effect and a cooling effect simultaneously, and continuing the cooling effect after the cessation of the heating effect.

7. The portion of the method of electric resistance welding which comprises flowing water directly over the juncture while passing current through the juncture and continuing the flow of water after the cessation of the application of current.

8. The method of electric resistance butt welding which consists in bringing the metals to be welded into contact, passing current between said metals through the juncture while exerting pressure on the metals to complete the weld and flowing water over the juncture during the welding operation.

9. The method of electric resistance butt welding which consists in bringing the metals to be welded into contact, passing current between said metals through the juncture while exerting pressure on the metals to complete the weld and flowing water over the juncture, discontinuing the supply of current and continuing the flow of water to rapidly cool the work.

10. The portion of the method of electric resistance metal working which comprises passing current through and from one side to the other of the portion of the work to be operated on and simultaneously flowing a liquid over said portion of the work.

11. The portion of the method of electric resistance welding of metal bodies which comprises flowing a liquid over the work at the juncture while passing current between said metal bodies through the juncture.

12. The portion of the method of electrically welding copper bodies which consists in passing current between said metal bodies through the juncture and simultaneously flowing water over the juncture.

In witness whereof, we have hereunto set our hands this 13th day of August, 1914.

HENRY GEISENHÖNER.
EDGAR F. COLLINS.

Witnesses:
BENJAMIN B. HULL,
HELEN ORFORD.